Patented Mar. 17, 1925.

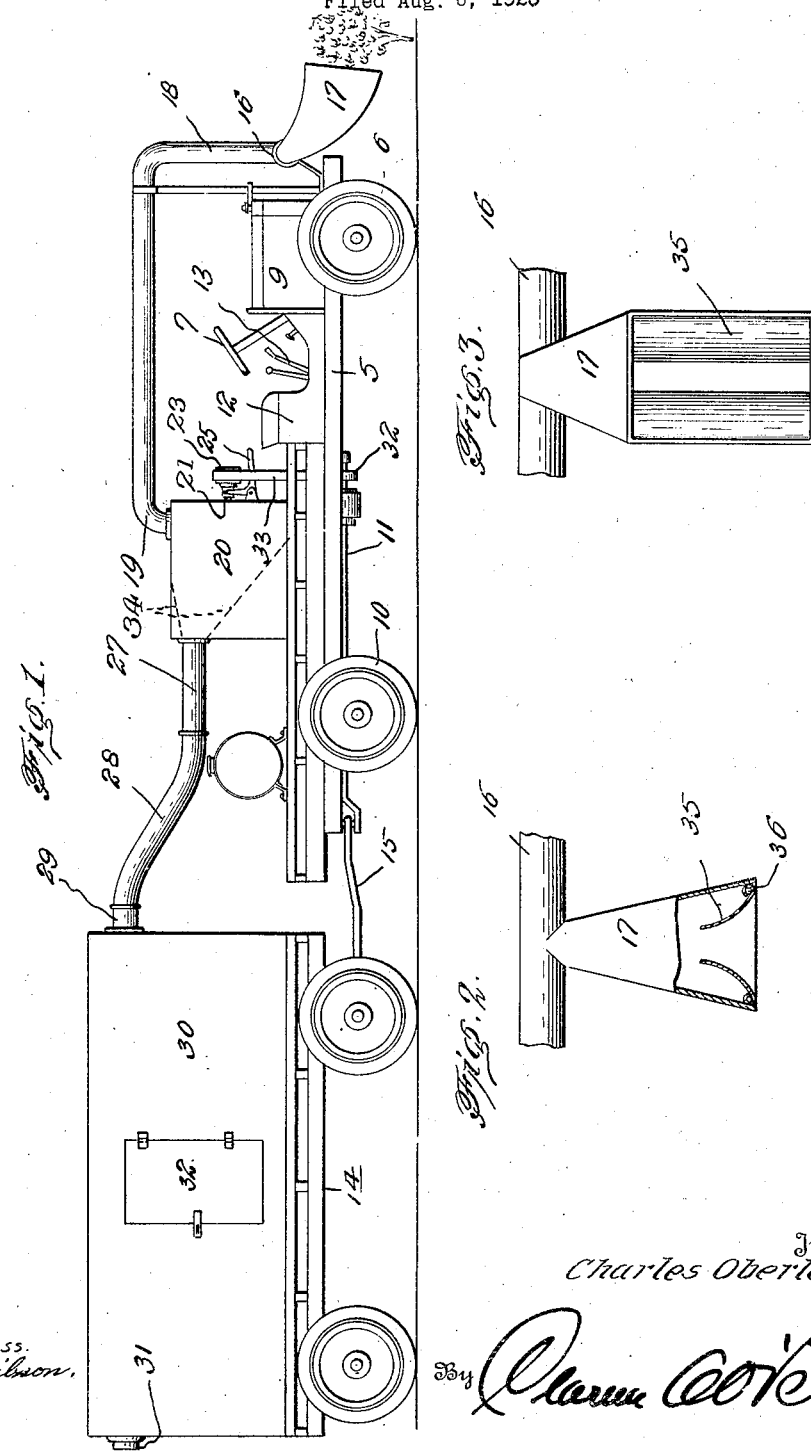

1,529,846

UNITED STATES PATENT OFFICE.

CHARLES OBERLE, OF OCEAN CITY, NEW JERSEY.

PNEUMATIC COTTON-PICKING APPARATUS.

Application filed August 6, 1923. Serial No. 655,849.

*To all whom it may concern:*

Be it known that I, CHARLES OBERLE, citizen of the United States, residing at Ocean City, in the county of Cape May and State of New Jersey, have invented certain new and useful Improvements in Pneumatic Cotton-Picking Apparatus, of which the following is a specification.

This invention relates to certain new and useful improvements in pneumatic cotton picking apparatus, and has for its principal object to generally simplify and improve devices of this kind.

A further object of the invention is to embody a practical arrangement of mechanisms for the pneumatic picking of cotton upon an ordinary motor truck and trailer whereby the invention may be employed for harvesting cotton over a large area with facility and ease.

Another object of the invention is to provide a pneumatic cotton picking apparatus which embraces the desired qualities of simplicity of construction, durability, and efficiency in operation.

A still further object of the invention is to embody novel means for controlling and driving the suction fan of the apparatus in a simple and practical manner.

Other objects will become apparent as the nature of the invention is better understood and the same consists in the novel form, combination and arrangement of parts hereinafter more fully described, shown in the accompanying drawings, and claimed.

In the drawings, wherein like reference characters indicate corresponding parts throughout the several views.

Figure 1 is a side elevational view of a cotton picking apparatus constructed in accordance with the present invention.

Figure 2 is a fragmentary view, partly in plan and partly in horizontal section of one of the intake nozzles of the apparatus, and Figure 3 is a front elevational view of the device shown in Figure 2.

Referring more in detail to the drawings, the present invention embodies a well known form of motor truck embodying a platform 5 having front supporting and steering wheels 6 controlled by the usual steering handle 7 and embodying an engine under the front hood 9, which is employed in a well known manner for driving the rear supporting wheels 10, which means includes the longitudinal propeller shaft 11 arranged under the platform 5.

A driver's seat 12 is located adjacent the hand brake 13 and the steering handle 7, while the truck is adapted to tow a trailer 14, by means of a draw bar connected therewith as at 15.

In accordance with the present invention, a manifold 16 is rigidly mounted in a horizontal position transversely of the forward end of the truck in front of the wheels 6 and extending forwardly from and communicating with the manifold 16 at its ends and at suitable intervals therebetween are a plurality of intake nozzles 17. The manifold 16 is provided with an outlet midway between its ends connected with a pipe 18 that extends upwardly above the driver's seat 12 and rearwardly of the latter where it terminates in a downturned end as at 19.

The fan casing 20 is mounted upon the platform 5 rearwardly of the driver's seat 12, and this casing has an opening in the forward part of the top wall into which the downturned end 19 of the pipe 18 is secured. Suitably journalled in the casing 20 longitudinally of the top is a shaft 21, which has a fan or impeller (not shown) secured thereon behind the end 19 of the pipe 18, and the forward end of the shaft 21 extends through the front wall of the casing 20 where it has a pulley 23 loosely arranged thereon. In order to provide for the convenient manual operation of a movable clutch element (not clearly shown) from the driver's seat 12, the lever 25 is pivoted to the front wall of the casing 20 and the free end of one arm of the same is formed to provide a shifting fork engaged with said clutch, the other arm of said lever 25 being extended forwardly to a point whereby the same may be readily swung vertically by the operator occupying the seat 12.

The rear wall of the fan casing 20 is provided with an outlet opening communicating with a tube or pipe 27 that extends rearwardly and is connected by means of a flexible conduit 28 with an intake pipe 29 of the closed body 30 of the trailer 14. As the body of the trailer is relatively large and occupies the entire platform thereof, it is apparent that the same can be proportioned to accommodate a relatively large quantity of cotton without interrupting the operation of the apparatus. Any suitable means, well known in the art may be provided for retaining the cotton within the body 30 while permitting the outlet of the air from said body to the rear outlet pipe 31 and one side of the body 30 may be provided with a door 32 adapted to be opened for removal of its harvested cotton from time to time.

The propeller shaft 11 is equipped with a pulley as generally indicated at 32 directly beneath the pulley 23 and an endless drive belt 33 passes around the pulley 32 and upwardly through the platform 5 and then around the pulley 23 so that rotation may be imparted to the last named pulley at all times when the propeller shaft 11 is operated or rotated.

In order to insure proper discharge of the cotton from the casing 20 into the pipe 27 thereon, the casing 20 may be provided with forwardly diverging plates 34 (dotted) which have their closely related ends coincident with the adjacent end edge of the pipe 27. The nozzles 17 are of flared form and directed downwardly and forwardly so as to lie in proper relation to the cotton plant for receiving the cotton therefrom as the machine or apparatus is propelled across the field. In order that the apparatus may function with highest efficiency at all times, in accordance with various conditions met, the openings at the intake ends of the nozzles 17 may be varied in size by means of adjustable doors or shutters 35 disposed in the mouth of said nozzle and frictionally mounted upon vertical pivots as at 36 so as to swing inwardly to open position and forwardly for restricting the passage or mouth of the nozzle.

In operation, the engine 8 is placed into operation, and the control lever 13 is properly manipulated for driving the rear wheel 10 through a well known mechanism including the longitudinal propeller shaft 11. As soon as the nozzles 17 approach the platform, the lever 25 is depressed for clutching the pulley 23 to the shaft 21 so that said shaft 21 will be operated through the gearing described from the propeller shaft 11 for rotating the fan. As the cotton is encountered, the fan will suck the same into the nozzles 17 through the pipe 18 and into the casing 20, after which the fan will blow or force the cotton into the trailer body 30 through the pipe 27, 28 and 29, the cotton remaining within the body 30 and the air passing through the outlet 31.

From the foregoing description, it is believed that the construction and operation as well as the advantages of the present invention will be readily understood and appreciated by those skilled in the art.

Minor changes may be made without departing from the spirit and scope of the invention as claimed.

What I claim as new is:

A cotton harvesting nozzle comprising a body which is open from end to end and provided with converging upper and lower arcuate walls and plane converging side walls whereby the opening at one end of the body is larger than the opening at the other end thereof, the opposite edges of the walls at the larger open end of the body being disposed parallel with relation to each other whereby the body is rendered rectangular in transverse section at its larger end and shutters hingedly mounted in the nozzle at the edges of the side walls thereof and arranged to swing transversely of the curved walls of the body, said shutters being curved transversely.

In testimony whereof I affix my signature.

CHARLES OBERLE.